(12) United States Patent
Brownholtz et al.

(10) Patent No.: US 9,104,300 B2
(45) Date of Patent: Aug. 11, 2015

(54) DRAG AND DROP OBJECT ATTRIBUTE ASSIGNMENT FOR OBJECTS IN A GRAPHICAL USER INTERFACE (GUI)

(75) Inventors: Elizabeth A. Brownholtz, Andover, MA (US); Werner Geyer, Boston, MA (US); Martin J. Moore, Somerville, MA (US); Michael Muller, Medford, MA (US); Shilad W. Sen, Minneapolis, MN (US); Michael C. Wu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 11/873,772

(22) Filed: Oct. 17, 2007

(65) Prior Publication Data

US 2009/0106680 A1  Apr. 23, 2009

(51) Int. Cl.
  *G06F 3/00* (2006.01)
  *G06F 3/048* (2013.01)
  *G06F 3/0486* (2013.01)

(52) U.S. Cl.
  CPC .................................. *G06F 3/0486* (2013.01)

(58) Field of Classification Search
  USPC ........................................................ 715/769
  See application file for complete search history.

(56) References Cited

U.S. PATENT DOCUMENTS

| | | | |
|---|---|---|---|
| 5,404,440 A * | 4/1995 | Asahi ............................ | 715/746 |
| 5,710,894 A | 1/1998 | Maulsby et al. | |
| 5,715,413 A | 2/1998 | Ishai et al. | |
| 5,745,112 A * | 4/1998 | Hirose ........................... | 715/769 |
| 5,913,063 A | 6/1999 | McGurrin et al. | |
| 6,570,592 B1 * | 5/2003 | Sajdak et al. .................. | 715/769 |
| 6,720,985 B1 * | 4/2004 | Silverbrook et al. .......... | 715/863 |
| 6,772,341 B1 | 8/2004 | Shrader et al. | |
| 6,775,771 B1 | 8/2004 | Shrader et al. | |
| 6,914,985 B1 | 7/2005 | Shrader et al. | |
| 6,928,453 B2 | 8/2005 | Roddy | |
| 7,721,270 B2 * | 5/2010 | Ukelson et al. ................ | 717/136 |

OTHER PUBLICATIONS

TechTerms "Heuristic" Definition, reterived Mar. 3, 2011, 1 page.*

* cited by examiner

*Primary Examiner* — Yongjia Pan
(74) *Attorney, Agent, or Firm* — Steven Greenberg, Esq.; CRGO Law

(57) ABSTRACT

Embodiments of the present invention address deficiencies of the art in respect to object attribution modification and provide a novel and non-obvious method, system and computer program product for drag and drop attributes for objects in a graphical user interface. In one embodiment of the invention, a method for drag and drop object attributes in a GUI can be provided. The method can include presenting draggable object attributes in the GUI, dragging one of the draggable object attributes into a separate target object in the GUI, and applying a value for the draggable object attribute to the separate target object. In one aspect of the embodiment, each of the draggable object attributes in the GUI can be separate and independent from any particular object in the GUI. In another aspect of the embodiment, each of the draggable object attributes in the GUI can be draggable from the particular object to a target object in the GUI.

27 Claims, 2 Drawing Sheets

DRAG AND DROP OBJECT ATTRIBUTE ASSIGNMENT FOR OBJECTS IN A GRAPHICAL USER INTERFACE (GUI)

BACKGROUND OF THE INVENTION

1. Field of the Invention

The present invention relates to the field of object manipulation in a graphical user interface (GUI) and more particularly to attribute configuration for objects within a GUI.

2. Description of the Related Art

The modern computing environment incorporates object oriented notions in providing a navigable user interface and underlying program functionality. Object orientation requires the representation of data elements and programmatic logic alike as objects. Objects can include attributes that can be externally accessed for reading, writing or both. Objects further can include methods that can be externally invoked or internally invoked. Objects further can reference other objects such that the arrangement of objects can provide a data model, a program model, or commonly both a data and program model.

The graphical user interface for an operating system often provides a dialog box configured to permit both the viewing of object attributes and also the modification of object attributes. For example, the individual attributes can be presented textually within the dialog box and attributes can be modified for the object in the dialog box by selecting radio buttons, check boxes, sliders and drop-down boxes and by providing text input to text fields of the dialog box. Notably, the attribute settings for an object can be applied to other objects in some cases by selecting a menu choice to do as much. Additionally, an object can inherit the attributes of a related object where the object derives from or implements the related objects.

The object attribute dialog box, often referred to as a "properties" dialog box, can be invoked for an associated object in most cases through a context menu in association with the object. To apply attributes to an object requires the express invocation of the properties dialog box. Consequently, the application of attributes to an object is an indirect manipulation of the object and requires a familiarity on the part of the end user of the graphical user interface providing the properties dialog box.

Recognizing the human factors limitations of menu driven operations, drag-and-drop functionality has been incorporated into the graphical user interface, in particular to facilitate direct manipulation of "cut-copy-paste" operations. Drag-and-drop functionality, however, has not found widespread use for providing direct manipulation of other aspects of graphical user interface interactions.

BRIEF SUMMARY OF THE INVENTION

Embodiments of the present invention address deficiencies of the art in respect to object attribution modification and provide a novel and non-obvious method, system and computer program product for drag and drop attributes for objects in a graphical user interface. In one embodiment of the invention, a method for drag and drop object attributes in a GUI can be provided. The method can include presenting draggable object attributes in the GUI, dragging one of the draggable object attributes into a separate target object in the GUI, and applying a value for the draggable object attribute to the separate target object. In one aspect of the embodiment, each of the draggable object attributes in the GUI can be separate and independent from any particular object in the GUI. In another aspect of the embodiment, each of the draggable object attributes in the GUI can be draggable from the particular object to a target object in the GUI.

In another embodiment of the invention, a GUI data processing system can be provided. The system can include a GUI with objects and a GUI dialog of object attributes. The system also can include an event loop for the GUI and a drag-and-drop event handler for the event loop. The event handler can include program code enabled to respond to a drop event on a target one of the objects in the GUI by applying a value for a dragged one of the object attributes in the GUI dialog to the target one of the objects in the GUI. In one aspect of the embodiment, the GUI dialog of object attributes can include a dialog box of object attributes for a different one of the objects in the GUI. In another aspect of the embodiment, the GUI dialog of object attributes can include a dialog box of object attributes independently established from the objects in the GUI.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for drag-and-drop attributes for object attribute assignment in a GUI. In accordance with an embodiment of the present invention, a selection of object attributes can be presented in a GUI window and enabled for dragging and dropping onto a target object outside of the GUI window. One or more dragged and dropped object attributes, either alone or as a set of attributes, can be applied as object attributes for the target object if the target object permits the assignment of an object attribute for each attribute type of a dragged and dropped object attribute. In particular, sets of attributes can include persistence, allowing the sets of attributes to be applied as a group, in a single operation, to a series of objects. In one aspect of the embodiment, each set of attributes can be named and stored for subsequent use. In this way, end users need not invoke a dialog box for a target object in establishing object attributes for the target object.

Figure 1:
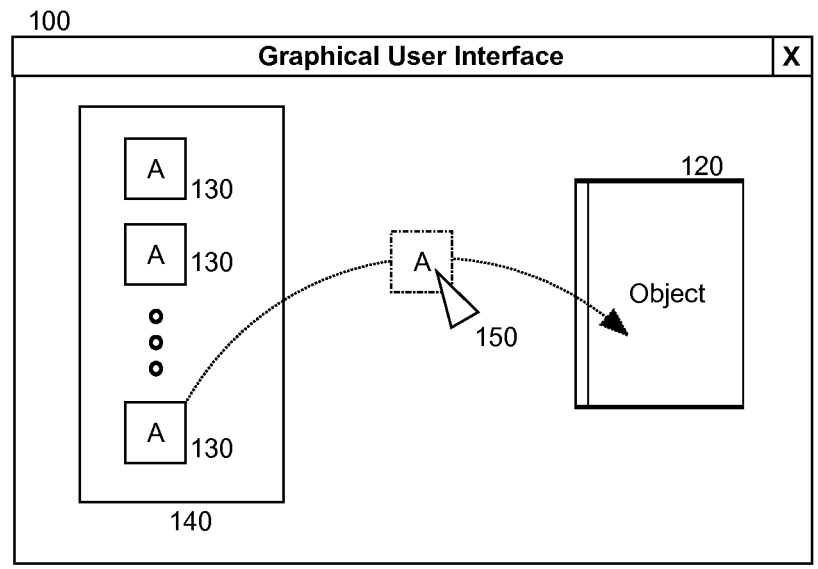
FIG. 1 is a pictorial illustration of a GUI configured for drag-and-drop attributes for object attribute assignment.

In illustration, FIG. 1 is a pictorial illustration of a GUI configured for drag-and-drop attributes for object attribute assignment. The GUI 100 can include one or more objects 120 (only a single object shown for the purpose of illustrative simplicity). An object 120 can include, by way of example, a logical reference to a document, a logical reference to an application, a logical reference to a module or functional portion of an application, a logical reference to a user of an application, or a logical reference to application data. The GUI 100 further can include a dialog of object attributes 140 displaying a set of object attributes 130. The object attributes 130 can include one or more parameters or settings to be applied to corresponding ones of the objects 120.

The dialog of object attributes 140 can include a dedicated GUI window presenting an interface to multiple different object attributes 130 through which the different object attributes 130 can be configured with corresponding attribute values. Alternatively, the dialog of object attributes 140 can be a GUI window invoked through a context menu and dedicated to a particular object in the GUI and including one or more object attributes for the particular object. In either circumstance, the object attributes 130 can be configured for dragging and dropping onto objects 120.

Specifically, a selected one of the object attributes 130 can be dragged by pointing device 150 and dropped onto object 120. The resulting drag and drop event can be trapped by an event handler for object 120 and processed through a corresponding event handler for the drag and drop event. The attribute type for the selected one of the object attributes 130 can be compared to the object 120 to determine whether an attribute for the object 120 can be set by a value for the selected one of the object attributes 130. If so, the event handler for the object 120 can apply the value for the selected one of the object attributes 130 to the object 120.

Figure 2:
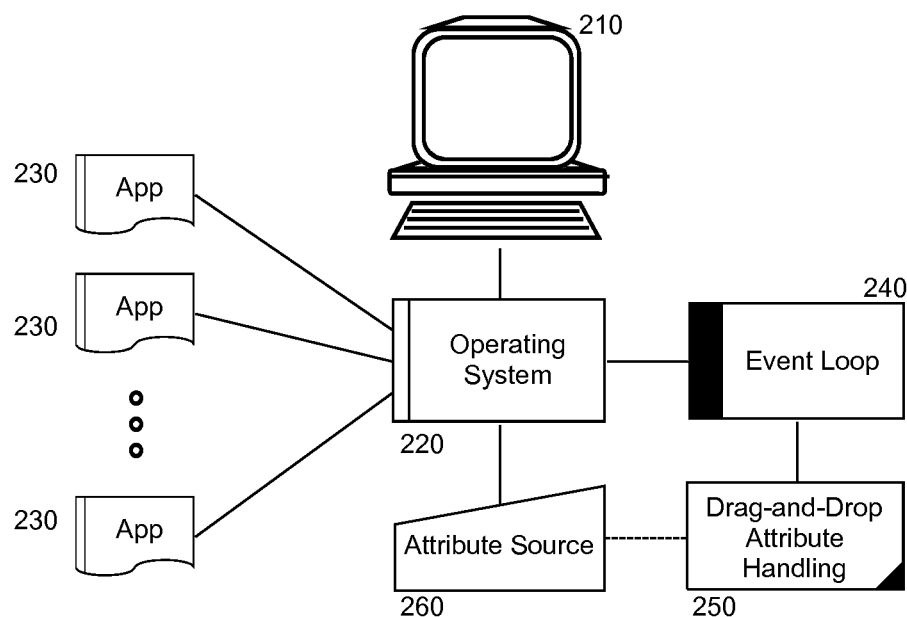
FIG. 2 is a schematic illustration of a computing system configured for drag-and-drop attributes for object attribute assignment in a GUI; and, FIG. 3 is a flow chart illustrating a process for drag-and-drop attributes for object attribute assignment in a GUI.

The GUI 100 of FIG. 1 can be provided by an operating system in a host computing system. In further illustration, FIG. 2 is a schematic illustration of a computing system configured for drag-and-drop attributes for object attribute assignment in a GUI. As shown in FIG. 2, a host computing platform 210, for example a personal computer, can include an operating system 220. The operating system 220 can support the operation of one or more applications 230 and can provide a GUI through which an end-user can interact with the graphical elements of both the operation system 220 and the supported applications 230. Additionally, an event loop 240 can be provided for the operating system 220 in order to trap and delegate the processing of GUI events received in the operating system 220, including drag-and-drop events.

Notably, drag-and-drop attribute handling logic 250 can be coupled to the event loop 240. The drag-and-drop attribute handling logic 250 can include program code enabled to receive and process drag-and-drop events for dragged and dropped object attributes from an attribute source 260 onto target objects in the operating system 220 or in any of the applications 230. The program code can be enabled to determine whether a specific one of the object attributes dragged onto a target object has an object attribute type supported by the target object. The program code further can be enabled to apply an attribute value for the dragged and dropped object attribute to a corresponding attribute in the target object when it is determined that a specific one of the object attributes dragged onto a target object has an object attribute type supported by the target object.

Notably, the attribute source 260 can include a dialog of draggable object attributes established independently of any given object in a GUI defined by the operating system 220. Different sets of the object attributes can be arranged such that an entire set of object attributes can be dragged and dropped onto a target object and applied to the target object as a unit. Alternatively, the attribute source 260 can include a dialog of object attributes for a particular target object, though each of the object attributes in the attribute source 260 can be independently dragged onto a target object so as to impart a corresponding object attribute value onto the target object.

Figure 3:
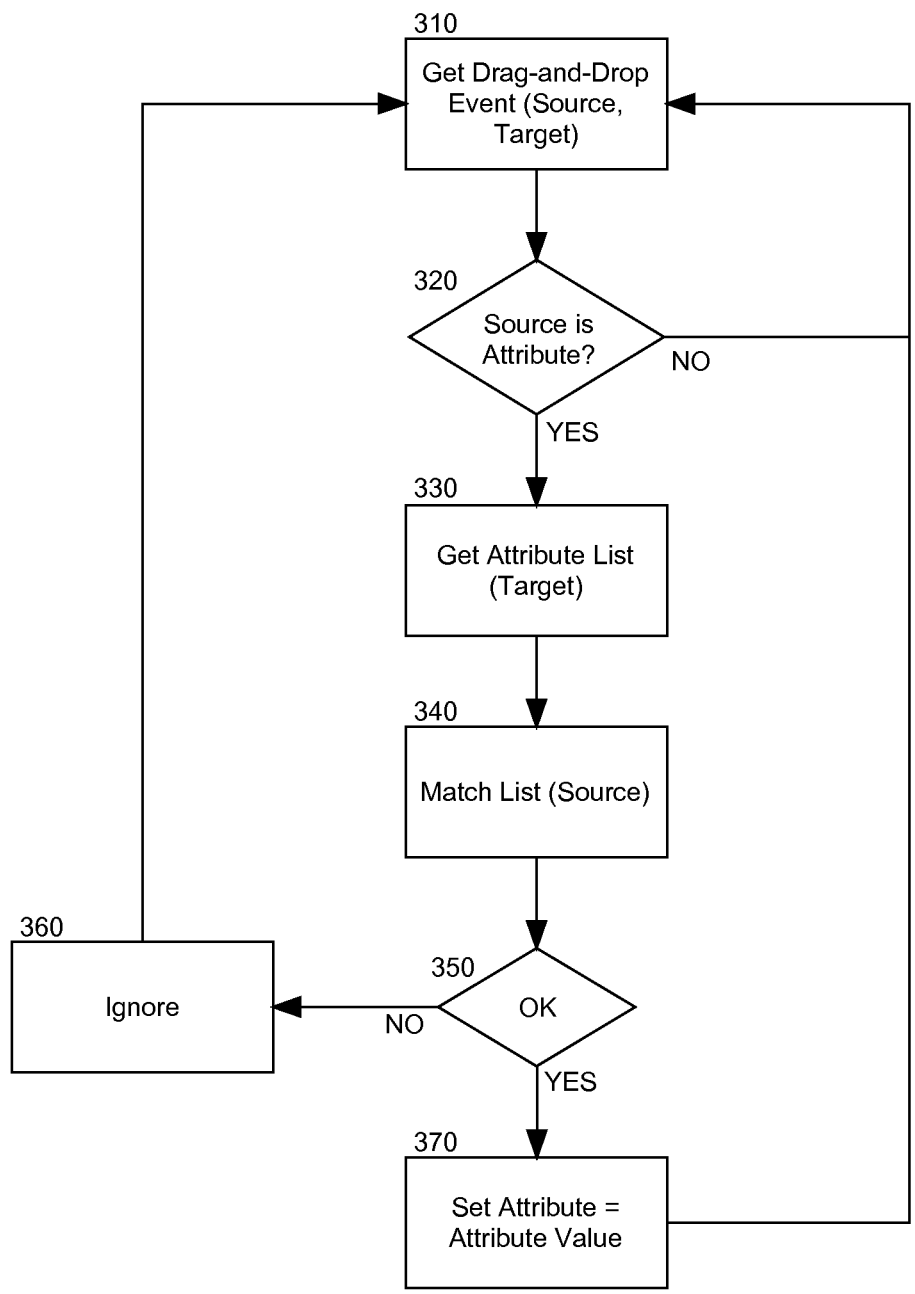

In yet further illustration, FIG. 3 is a flow chart illustrating a process for drag-and-drop attributes for object attribute assignment in a GUI. Beginning in block 310, a drag-and-drop event can be received specifying both a source object and a target object. The source object and target object can be included as part of an operating system, or as part of an application supported by the operating system. In decision block 320, it can be determined whether the source object is a dropped object attribute. If so, in block 330 a list of available object attributes for the target object can be received and compared to the dropped object attribute in block 340.

In decision block 350 it can be determined whether the dropped object attribute matches an available attribute for the target object. If not, in block 360 the dropped object attribute can be ignored and the process can return to block 310. However, if it is determined that the dropped object attribute matches an available attribute for the target object, in block 370 a value for the dropped object attribute can be set for the matching attribute in the target object. In this way, drag and drop object attributes can be enabled for the target object.

It is to be recognized that it is desirable to apply a transformation to one object, and subsequently to apply the same transformation to another object. Accordingly, in an aspect of the embodiments described herein, one or more attributes can be dragged from an object into a temporary buffer into which the attributes can be stored. Thereafter, the attributes can then be dragged from the temporary buffer onto other objects. Additionally, once attributes are present in the temporary buffer, the attributes within the buffer can be edited by an end user.

Of further note, in yet another aspect of the embodiment, heuristic mapping of attributes can be established for transforming an attribute from a source object for application to a target object. For example, a source text object might include the attribute of the color of text, however a target object may not include text, but a shape. Accordingly mapping the color from the source object to the target object, dragging and dropping the text color attribute from the source object to the text object according to a heuristic mapping will result in the color of the text in the source object being applied as a shape fill color in the target object. Furthermore, to the extent that an ambiguity arises from the mapping as to how to transform a particular object, e.g. applying the text color as a shape fill color or shape border color, the end user can be prompted to resolve the ambiguity with the historical choices of the end user in resolving ambiguities being applied optionally to avoid prompting the end user for subsequent instances of ambiguity.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for drag and drop object attributes in a graphical user interface (GUI), the method comprising:
   presenting draggable object display attributes in the GUI, the display attributes defining a way in which a corresponding object to which the attribute is applied is displayed in the GUI;
   dragging one of the draggable object attributes into a separate target object in the GUI; and,
   applying a value for the draggable object attribute to the separate target object;
   wherein applying a value for the draggable object attribute to the separate target object from within the event handler, comprises:
   responsive to concluding that the draggable object attribute cannot be directly applied to the target object because the target object is of a type that differs from a type of the corresponding object, determining a heuristic mapping to transform the draggable object attribute to a different attribute compatible for the type of the target object for application to the target object and, applying a transformed form of the draggable object attribute to the target object so as to change a way in which the target object is displayed in the GUI.

2. The method of claim 1, wherein presenting draggable object attributes in the GUI, comprises presenting draggable object attributes in the GUI, each of the draggable object attributes in the GUI being separate and independent from any particular object in the GUI.

3. The method of claim 2, further comprising associating different ones of the draggable object attributes with one another in a set and rendering the set draggable onto a target object in the GUI.

4. The method of claim 3, further comprising storing the set of attributes for subsequent application to a target object in the GUI.

5. The method of claim 1, wherein presenting draggable object attributes in the GUI, comprises presenting draggable object attributes for a particular object in the GUI, each of the draggable object attributes in the GUI being draggable from the particular object to a target object in the GUI.

6. The method of claim 1, wherein dragging one of the draggable object attributes into a separate target object in the GUI, comprises:
   dragging and dropping at least one of the draggable object attributes into a buffer area; and
   subsequently dragging and dropping the at least one of the draggable attributes from the buffer area onto the separate target object in the GUI.

7. The method of claim 1, wherein applying a value for the draggable object attribute to the separate target object, comprises:
   trapping a drag-and-drop event in an event handler;
   identifying the draggable object attribute and the target object in the event; and,
   applying a value for the draggable object attribute to the separate target object from within the event handler.

8. The method of claim 7, wherein applying a value for the draggable object attribute to the separate target object from within the event handler, comprises:
   matching the draggable object attribute with available object attributes for the separate target object; and,
   applying a value for the draggable object attribute to the separate target object from within the event handler in response to a match.

9. The method of claim 1, wherein determining a heuristic mapping to transform the draggable object attribute for application to the target object comprises:
   encountering an ambiguity in the heuristic mapping; and
   prompting an end user to choose among different potentially applicable transformations of the draggable object attribute.

10. The method of claim 9, further comprising:
    recording an end user choice for resolving the ambiguity in the heuristic mapping; and,
    subsequently applying the recorded end user choice when encountering a subsequent incidence of the ambiguity.

11. A graphical user interface (GUI) data processing system comprising:
    a computer with at least one processor and memory;
    a GUI defined in the memory of the computer comprising a plurality of objects;
    a GUI dialog of object display attributes, the attributes defining a way in which a corresponding object to which the attribute is applied is displayed in the GUI;
    an event loop for the GUI; and,
    a drag-and-drop event handler for the event loop executing in the computer, the event handler comprising program code enabled to respond to a drop event on a target one of the objects in the GUI by applying a value for a dragged one of the object attributes in the GUI dialog to the target one of the objects in the GUI;
    wherein applying a value for the dragged one of the object attributes in the GUI dialog to the target one of the objects in the GUI comprises, in response to concluding that the dragged one of the object attributes cannot be directly applied to the target one of the objects because the target one of the objects is of a type that differs from a type of the corresponding object determining a heuristic mapping to transform the dragged one of the object attributes to a different attribute compatible for the type of the target one of the objects for application to the target one of the objects and, applying a transformed form of the dragged one of the object attributes to the target one of the objects so as to change a way in which the target one of the objects is displayed in the GUI.

12. The system of claim 11, wherein the GUI dialog of object attributes comprises a dialog box of object attributes for a different one of the objects in the GUI.

13. The system of claim 11, wherein the GUI dialog of object attributes comprises a dialog box of object attributes independently established from the objects in the GUI.

14. The system of claim 13, wherein the GUI dialog of object attributes further comprises a set of the object attributes arranged to be dragged and dropped onto a target one of the objects in the GUI as a unit.

15. The system of claim 11, wherein the GUI is part of an application supported by an operating system.

16. The system of claim 11, wherein the GUI is part of an operating system.

17. A computer program product comprising a non-transitory computer usable medium embodying computer usable program code for drag and drop object attributes in a graphical user interface (GUI), the computer program product comprising:
   computer usable program code for presenting draggable object display attributes in the GUI, the display attributes defining a way in which a corresponding object to which the attribute is applied is displayed in the GUI;
   computer usable program code for dragging one of the draggable object attributes into a separate target object in the GUI; and,
   computer usable program code for applying a value for the draggable object attribute to the separate target object, wherein applying a value for the draggable object attribute to the separate target object from within the event handler, comprises, responsive to concluding that the draggable object attribute cannot be directly applied to the target object because the target object is of a type that differs from a type of the corresponding object, determining a heuristic mapping to transform the draggable object attribute to a different attribute compatible for the type of the target object for application to the target object and, applying a transformed form of the draggable object attribute to the target object so as to change a way in which the target object is displayed in the GUI.

18. The computer program product of claim 17, wherein the computer usable program code for presenting draggable object attributes in the GUI, comprises computer usable program code for presenting draggable object attributes in the GUI, each of the draggable object attributes in the GUI being separate and independent from any particular object in the GUI.

19. The computer program product of claim 18, further comprising computer usable program code for associating different ones of the draggable object attributes with one another in a set and rendering the set draggable onto a target object in the GUI.

20. The computer program product of claim 17, wherein the computer usable program code for presenting draggable object attributes in the GUI, comprises computer usable program code for presenting draggable object attributes for a particular object in the GUI, each of the draggable object attributes in the GUI being draggable from the particular object to a target object in the GUI.

21. The computer program product of claim 17, wherein dragging one of the draggable object attributes into a separate target object in the GUI, comprises:
   dragging and dropping at least one of the draggable object attributes into a buffer area; and
   subsequently dragging and dropping the at least one of the draggable attributes from the buffer area onto the separate target object in the GUI.

22. The computer program product of claim 17, wherein the computer usable program code for applying a value for the draggable object attribute to the separate target object, comprises:
   computer usable program code for trapping a drag-and-drop event in an event handler;
   computer usable program code for identifying the draggable object attribute and the target object in the event; and,
   computer usable program code for applying a value for the draggable object attribute to the separate target object from within the event handler.

23. The computer program product of claim 22, wherein the computer usable program code for applying a value for the draggable object attribute to the separate target object from within the event handler, comprises:
   computer usable program code for matching the draggable object attribute with available object attributes for the separate target object; and,
   computer usable program code for applying a value for the draggable object attribute to the separate target object from within the event handler in response to a match.

24. The computer program product of claim 17, wherein the computer usable program code for determining a heuristic mapping to transform the draggable object attribute for application to the target object comprises:
   computer usable program code for encountering an ambiguity in the heuristic mapping; and
   computer usable program code for prompting an end user to choose among different potentially applicable transformations of the draggable object attribute.

25. The computer program product of claim 24, further comprising:
   computer usable program code for recording an end user choice for resolving the ambiguity in the heuristic mapping; and,
   computer usable program code for subsequently applying the recorded end user choice when encountering a subsequent incidence of the ambiguity.

26. The computer program product of claim 17, further comprising computer usable program code for associating different ones of the draggable object attributes with one another in a set and rendering the set draggable onto a target object in the GUI.

27. The computer program product of claim 26, further comprising computer usable program code for storing the set of attributes for subsequent application to a target object in the GUI.

* * * * *